(12) United States Patent
Myers

(10) Patent No.: US 6,609,317 B2
(45) Date of Patent: Aug. 26, 2003

(54) SIGNS FOR DISPLAY OF STORE ITEM LOCATION SYSTEMS

(76) Inventor: Roy A. Myers, 666 Rancho Vista Rd., Vista, CA (US) 92083-5927

( * ) Notice: Subject to any disclaimer, the term of this patent is extended or adjusted under 35 U.S.C. 154(b) by 29 days.

(21) Appl. No.: 10/026,902

(22) Filed: Dec. 27, 2001

(65) Prior Publication Data

US 2002/0124445 A1 Sep. 12, 2002

Related U.S. Application Data

(63) Continuation-in-part of application No. 09/342,136, filed on Jun. 29, 1999, now abandoned.

(51) Int. Cl.$^7$ ............................................... G09F 3/00
(52) U.S. Cl. ...................................... 40/308; 280/33.991
(58) Field of Search ............................. 40/308, 661.03; 248/223, 33.99 A

(56) References Cited

U.S. PATENT DOCUMENTS

| | | | | |
|---|---|---|---|---|
| RE24,297 E | * | 4/1957 | Brockway | 40/308 |
| 2,888,761 A | * | 6/1959 | Miller | 40/308 |
| 3,251,543 A | * | 5/1966 | Bush et al. | 235/1 R |
| 3,956,841 A | * | 5/1976 | Hensel | 40/308 |
| 3,958,102 A | * | 5/1976 | Burt | 235/385 |
| 4,122,957 A | * | 10/1978 | Allen et al. | 414/281 |
| 4,443,961 A | * | 4/1984 | Gilroy | 40/308 |
| 4,773,175 A | * | 9/1988 | Larsen | 40/308 |
| 5,127,674 A | * | 7/1992 | Lamphere et al. | 283/37 |
| 5,501,383 A | * | 3/1996 | Wilson | 224/411 |
| 6,177,880 B1 | * | 1/2001 | Begum | 340/5.9 |

* cited by examiner

*Primary Examiner*—Anthony Knight
*Assistant Examiner*—Vishal Patel

(57) ABSTRACT

A two part indexing and signage system for use with shopping carts and store aisles. The first part of the device includes a general indexing system attached to the back panel of the child seat on a shopping cart. The second part is in connection with the shelving typically containing the products in the aisle of the store and contains an alpha numerical key having three characters associated with each item in order to identify particular product positions within that aisle.

3 Claims, 4 Drawing Sheets

```
Index and location of some store
items.
```

```
abcde.....2      abcde.....2      abcde.....2
abced.....3      abced.....3      abced.....3
abced.....4      abced.....4      abced.....4
avbed.....5      avbed.....5      avbed.....5
abved.....5      abved.....5      abved.....5
abfeed....6      abfeed....6      abfeed....6
abede.....7      abede.....7      abede.....7
```

Part of Item Location System

AKNF DFD AURPO DFJKV NLKN AAKJHB AFRYYB
FHAI VQLLA HHYRB QTQCBVCNDXGH

| oedkfb | kjedn; | nmxbndj | ahjvxjhg | vfxjkhgv | scjhgcj | bevgfc h |
|--------|--------|---------|----------|----------|---------|----------|
| bcv kjub | k';klnm | ml;khv | fvf gvhh | nbghhbl | nmkm"n | gfckjhvh |
| vgcv kjbn | hbljk | bnkjbn; | nmnm';l | cvvcvx | dxhgff | cdjhgv |
| hg;kjbjj | jbnkjbn | n;ljkyfr | hvvpo[ | i;lknpo | onh['[jio | jl[ipj]lpkl |
| jhygolkj | gtojkh | kjnjnmh | hyvikib | cgvnb | drfdtr | ujnmlk, |
| trijhhoiu | puihpi | hpoinhp | hngbnh | hupnnn | upnoni | yngftdfnd |
| 76o9thyf | 4cdygvouy | ihrfxds | hjefisnff | hgfyhyh | nngfc | mmnnhh |
| oedkfb | kjedn; | nmxbndj | ahjvxjhg | vfxjkhgv | scjhgcj | bevgfc h |
| bcv kjuh | k';klnm | ml;khv | fvf gvhh | nbghhbl | nmkm"n | gfckjhvh |
| vgcv kjbn | hbljk | bnkjbn; | nmnm';l | cvvcvx | dxhgff | cdjhgv |
| hg;kjbjj | jbnkjbn | n;ljkyfr | hvvpo[ | i;lknpo | onh['[jio | jl[ipj]lpkl |
| jhygolkj | gtojkh | kjnjnmh | hyvikib | cgvnb | drfdtr | ujnmlk, |
| trijhhoiu | puihpi | hpoinhp | hngbnh | hupnnn | upnoni | yngftdfnd |
| 76o9thyf | 4cdygvouy | ihrfxds | hjefisnff | hgfyhyh | nngfc | mmnnhh |
| oedkfb | kjedn; | nmxbndj | ahjvxjhg | vfxjkhgv | scjhgcj | bevgfc h |
| bcv kjuh | k';klnm | ml;khv | fvf gvhh | nbghhbl | nmkm"n | gfckjhvh |
| vgcv kjbn | hbljk | bnkjbn; | nmnm';l | cvvcvx | dxhgff | cdjhgv |
| hg;kjbjj | jbnkjbn | n;ljkyfr | hvvpo[ | i;lknpo | onh['[jio | jl[ipj]lpkl |
| jhygolkj | gtojkh | kjnjnmh | hyvikib | cgvnb | drfdtr | ujnmlk, |
| trijhhoiu | puihpi | hpoinhp | hngbnh | hupnnn | upnoni | yngftdfnd |
| 76o9thyf | 4cdygvouy | ihrfxds | hjefisnff | hgfyhyh | nngfc | mmnnhh |
| oedkfb | kjedn; | nmxbndj | ahjvxjhg | vfxjkhgv | scjhgcj | bevgfc h |
| bcv kjuh | k';klnm | ml;khv | fvf gvhh | | nmkm"n | gfckjhvh |

FIG. 7

Index and location of some store items.

```
abcde.....2      abcde.....2      abcde.....2
abced.....3      abced.....3      abced.....3
abced.....4      abced.....4      abced.....4
avbed.....5      avbed.....5      avbed.....5
abved.....5      abved.....5      abved.....5
abfeed....6      abfeed....6      abfeed....6
abede.....7      abede.....7      abede.....7
```

Figure 8

SIGNS FOR DISPLAY OF STORE ITEM LOCATION SYSTEMS

This application is a continuation in part of U.S. Ser. No. 09/342,136 filed Jun. 29, 1999, now abandoned.

FIELD AND BACKGROUND OF THE INVENTION

The invention relates to the field of retail stores and in particular to an item locator sign or indexing system comprised of two parts and having a first part that is general to the store and a second part that is aisle specific and contains a listing of the items in that aisle along with a more particularized method of identifying item locations within that aisle.

The device is intended to be used in retail establishments such as grovery stores, supermarket, chain stores, super stores, and the like although any store having multiple aisles and different categories of products may find use for the invention.

PRIOR ART

There are no known two part systems for store item location systems that are similar to the applicant's system.

SUMMARY OF THE INVENTION

The invention is a two part indexing and signage system for the location of store items in particular those items found in super markets and typically identified by the their location with the aisles of the supermarket or grocery store.

The first part of the device includes a general indexing system for identifying which aisle different store items are to be found in. The first part of the device is attached to the back panel of the child seat on a shopping cart where it can be seen easily by the shopper pushig the cart.

The second part of the device is in connection with the shelving typically containing the products in the aisle of the store. The second part contains particular indexing information that pertains to the location within the store aisle for the various items found in that aisle of the store. The second part contains an alpha numerical key having three characters associated with each item in order to identify particualr product positions within that aisle in terms of: left or right (side of the aisle); distance (in terms of feet) from the end of the aisle to the product in question and a single digit character indicating what shelf that item is on.

It is an object of the invention to save space on the generalized store item locator of part one which can include briefer more general descriptions of the items in the store while reserving the more particular descriptions of the locations to aisle specific indexing signs.

It is another objective to save the time and trouble of having to remove entire stores full of the second part signs and instead only have to change the second part signs when the location of items within that particular aisle are changed.

Another object is to provide a method for retailers to get added messages in front of consumers by providing a means of indexing signs that will encourage shoppers to look up various items on aisle specific signs where the retailer can place messages in addition to mere indexing such as those of an advertising nature that will allow the retailer to place additional information to the consumer while he or she is shopping in the store or supermarket.

Another object is to provide a method for saving time spent on shopping for particular items within a supermarket in order togive more time to the consumer when he/she may find other products to buy and hence purchase more products when they visit the store.

Another object is to provide an indexing system for a grocery store or supermarket in order to increase the number of retail messages and product locations within the store without adding to the expense of running the store and/or adding to the labor burden in maintaining such a system.

Another object is to provide a two part store item lcoation system that greatly increase the amount of such item location information over a single part signage system.

Other advantages will occur to those skilled in the art once the invention is shown and described.

DESCRIPTION OF THE FIGURES

FIG. 7 written index portion of part one showing indexing example;

FIG. 8 index portion of part two for use on shelving.

DESCRIPTION OF THE PREFERRED EMBODIMENT

Figure 1:
FIG. 1 use of first part item locator device on shopping cart.
Figure 2:
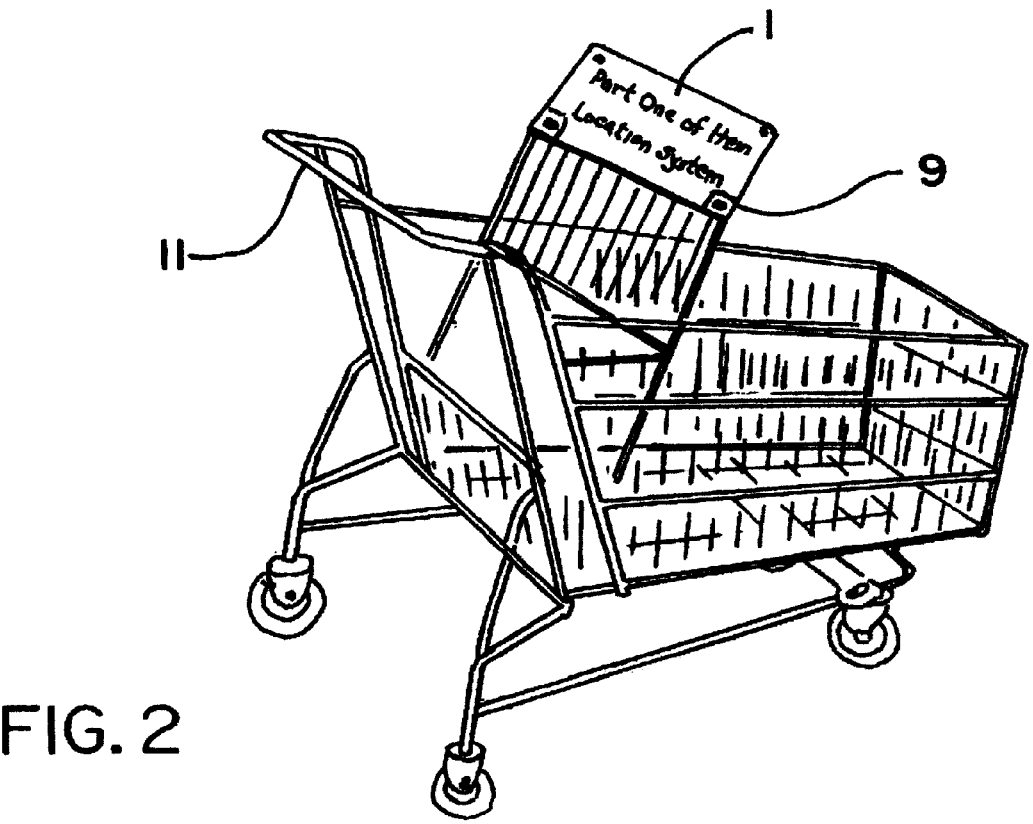
FIG. 2 similar to FIG. 1.

The first part of the invention consists of a placard or similar sign display device that holds an indexing sheet complete with writing that describes the location of various items in the store. See FIG. 1. Such description can be rather general and related to product location by aisle. The second part of the system is specific to each aisle and has a more complete breakdown of the items in that aisle and their particular location within the aisle. The first part will find primary use on grocery carts and in particular in a position on such cart where it can be read by one who is pushing the cart.

Thus the first part indexing information may contains wording such as "Beans . . . aisle 7" I.e. no more particular than that. As the first part works with the second part, there is no need to be more specific as to the exact location of the beans until the user gets to aisle 7 and finds the proper locating index for that particular aisle where further signs will direct him or her to the exact location of the beans.

All first part signs used on the shopping cart at a given store location would not vary in their informational content as they are designed to be general indexing system as a guide for the entire store. The index shown in FIG. 7 is by means of example and is not meant to limit the invention the particular language or format of such language found on the written portion of the index cards.

Figure 3:
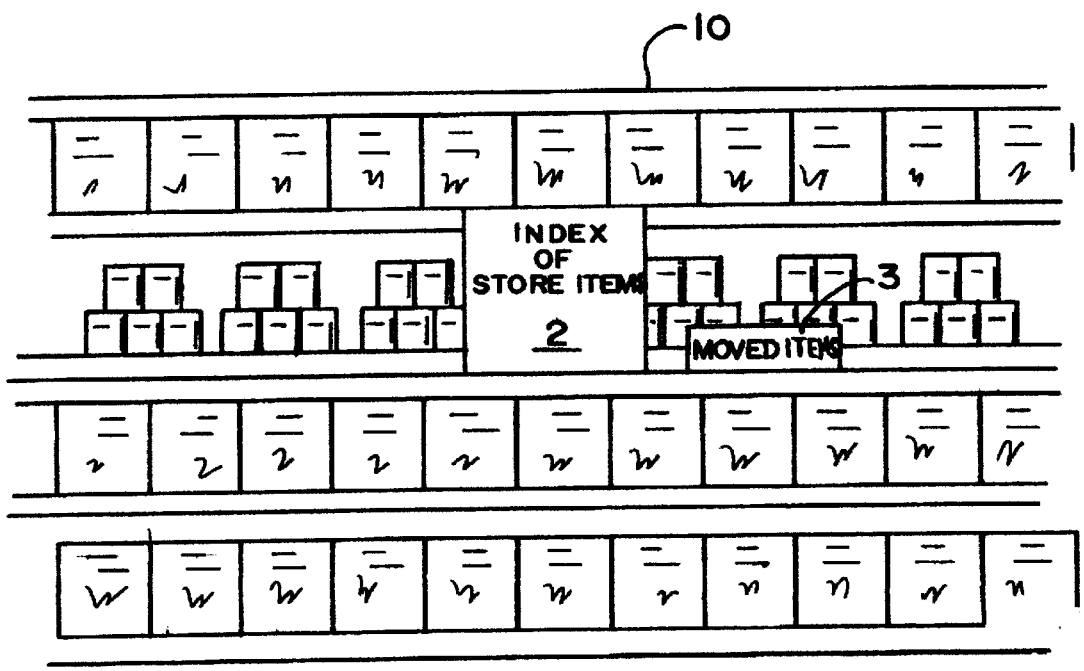
FIG. 3 use of second part item locator on store shelving.

The second part of the invention are aisle index cards that will vary from aisle to aisle as they contain written material pertaining to the actual items that are in that particular aisle. FIG. 3 depicts the use of these signs in connection with the aisle where the sign is shown attached to the shelving.

As such, these second part cards or signs must necessarily vary in content with each aisle. The information on the second part signs includes an alphabetical listing by name of all (or most) of the items in that aisle as well as an alpha numerical code that describes the location of each item in that aisle.

As seen in FIG. 8 the alphanumerical information includes three bits of information: the letters "L" or "R" to designate which side (left or right) of the aisle that the item is on; a first numeral (2 digit) to describe the approximate distance (in units of feet or possibly other units) that the item is from the end of the aisle; and second numeral (1 digit usually) to describe which shelf that item is on. For instance, if the second numeral is a "4" that means that it is on the fourth shelf from the top.

The use of the second part signs are believed to offer valuable assistance to the store customer as they will be more detailed and more particular in the type and amount of information that can be listed there. Information on the sign will indicate where in particular that item is within the particular aisle in question.

This offers an advantage to the retailers as well as the customer. The retailer can keep his customers updated as to the location of the various items in addtion to putting other messages about new products, store specials and other promotions on the secondary cards. The location of the items within a given aisle may change often and thus it is necessary when using signs to upgrade this information by changing the entire sign. Since the second part signs are only particular to one area in the store, one merely has to change the signs for that aisle only. He does not need to upgrade the signs in the entire store. By the same token, he or she only needs to change the signs of that particular aisle when there is a change in item location within that particular aisle.

The preceding advantages stem in large part from the use of two separate signage systems in use throughout the store. Thus the advantages of the large sign are that the consumer can readily identify the aisle location of food generalities and find articles fast. Such large signs do not need to be readily changed since the general locations of products does not change as much as particular types of products within in a given aisle.

The advantages of the second part are that more specific information including the specific item location within the aisle can be placed on this sign and upgrades to this information need only be made to those signs in a particular aisle and wholesale changes do not need to be made to all such secondary signs in the store. Such information on the second part signs may updated periodically but only when changes are made within that particular aisle as the information on the second part indexing system is specific to that aisle.

Figure 4:
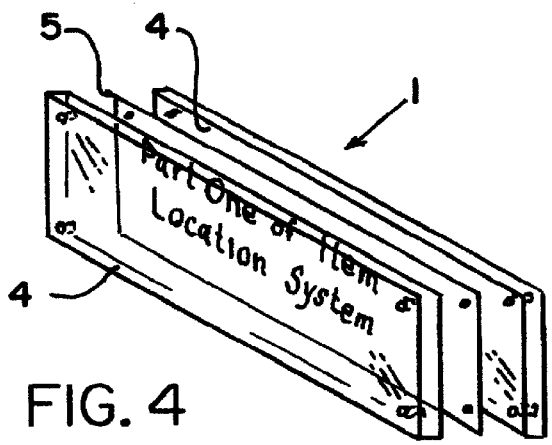
FIGS. 4–6 construction of sign structure for either part.
Figure 5:
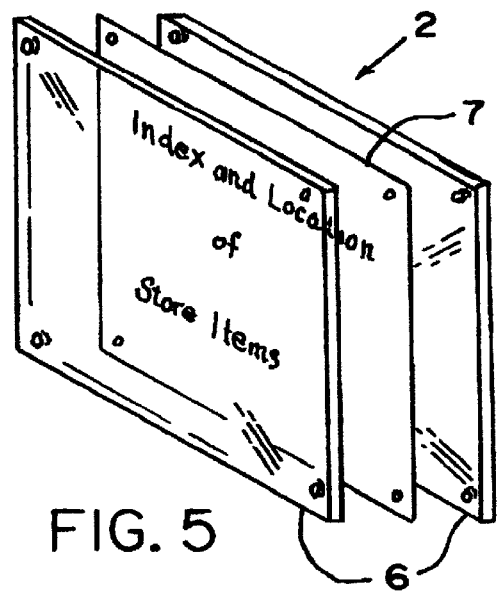
Figure 6:
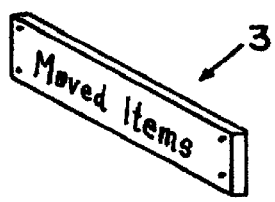

The signs themselves need not be of any particular type or variety. FIGS. 4-6 show examples of one type of construction that maybe used for the signs in order to provide a framework in order to secure the printed index card which may be made of paper, cardboard or the like. It is suggested that acrylic materials be used for the front and back of the signs as this will allow the users to see the information on the sign and still protect the paper that the index is printed on. The use of acrylic plastics is not meant to limit the invention and other materials could be used without varying from the spirit of the invention.

The first part of the indexing device may attached to back the child seat in the grocery carts. A system of bolts may be used to secure the frame of the sign to the metal work of the cart. Other places may find use for the sign without varying from the spirit of the invention. The second part of the indexing device may be used in connection with shelving and it is thought that metal or wood screws and/or bolts or metal ties ins may be used to connect the sign frames to the shelving. Other methods of attachment may be used without varying from the spirit of the invention.

The actual sizes of the sign frames may vary in accorance with the needs of the various signs throughout the store and the aisles. The printed informaion on the signs can be of languages other than English and may include more than one language on a given sign. It is also possible that one language can be used on one cart and another language used on another cart within the same store.

SERVICING THE ITEM LOCATION SYSTEM

The work in servicing the system can be done by store personnel at the time changes are made in the location of store items or the introduction of a new item for a store. A record is made by the store owner or operator of the various changes to items (new items and/or discontinued items as well as location changes) made over a period of time, such as six months.

At the end of that time, this list of changes and introductions of new items is given to the person or company that did the original placement of the signage of this system. The person or company responsible will typically have a list of all the products and locations in a storage system such as a computer.

The person or company will then bring their list of items and location up to date by referring to the list of the new changes. They will then product new counter sheets or signs for use in the store and forward these updated signs back to the store owner or operator for updated signage with the new locations and additions/discontinuances of the store items. The store personnel can then go about replacing the old signs with the new signs.

New items and items whose location in the store has changed can be indicated by colored coded slips of paper in the system. For example if an item is now new to the store, a red colored piece of paper with the information about the product can be used at that point in the store aisle. When an item's location has changed, a green sign indicating that the item location has changed can be placed at the former location of the item and can indicate to the consumer where to look in the store for the new item. This method will insure that the item location system can be kept up to date as well as reasonably possible.

I claim:

1. A two part indexing system for locating store items and for use in connection with shopping carts having baby seats and for use in connection with stores having shopping carts, as well as aisles that contain a vertical array of shelves having various store items upon said shelves; these aisle also have left and right sides as well as two ends; said system comprising: a first part, general item locator device having a first indexed list for a plurality of said store items and said first indexed list having associated with each of said items an aisle location corresponding to each said store item, said first part in connection with a shopping cart;

a second part, aisle indexing card, in connection with said store shelving associated with a particular aisle, said second locator having in connection a second indexed list of aisle-associated items residing in said particular aisle, said second indexed list having associated with each aisle-associated item an alpha numerical locating reference having 3 alpha-numerical designator, said first alpha-numerical part being a letter chosen from the letters "l" or "r" that corresponds to what side of the aisle said item is on; said second alph numerical designator being a two digit numeral corresponding to the location of said item in said aisle in terms of the approximte distance that item is from the end of the aisle, said third alphanumerical designator being a one digit numeral corresponding to the particular shelf that said item is located upon.

2. The system of claim 1 wherein said first part is connected to said baby seat of said shopping cart.

3. The system of claim 2 having update notices for use with store items whose location has been changed, said update notices in connection with the store shelves, said update notices containing information pertaining to a store item whose location within the store has changed and including the name of the item whose location has changed and the new location within the store where the item is now, said update notice placed in aisle in proximity to the former location of the store item.

* * * * *